No. 669,837. Patented Mar. 12, 1901.
L. JOHNSTONE.
APPARATUS FOR STRETCHING FABRIC USED IN MAKING COVERS FOR PNEUMATIC TIRES.
(Application filed Sept. 5, 1900.)
(No Model.) 5 Sheets—Sheet 1.
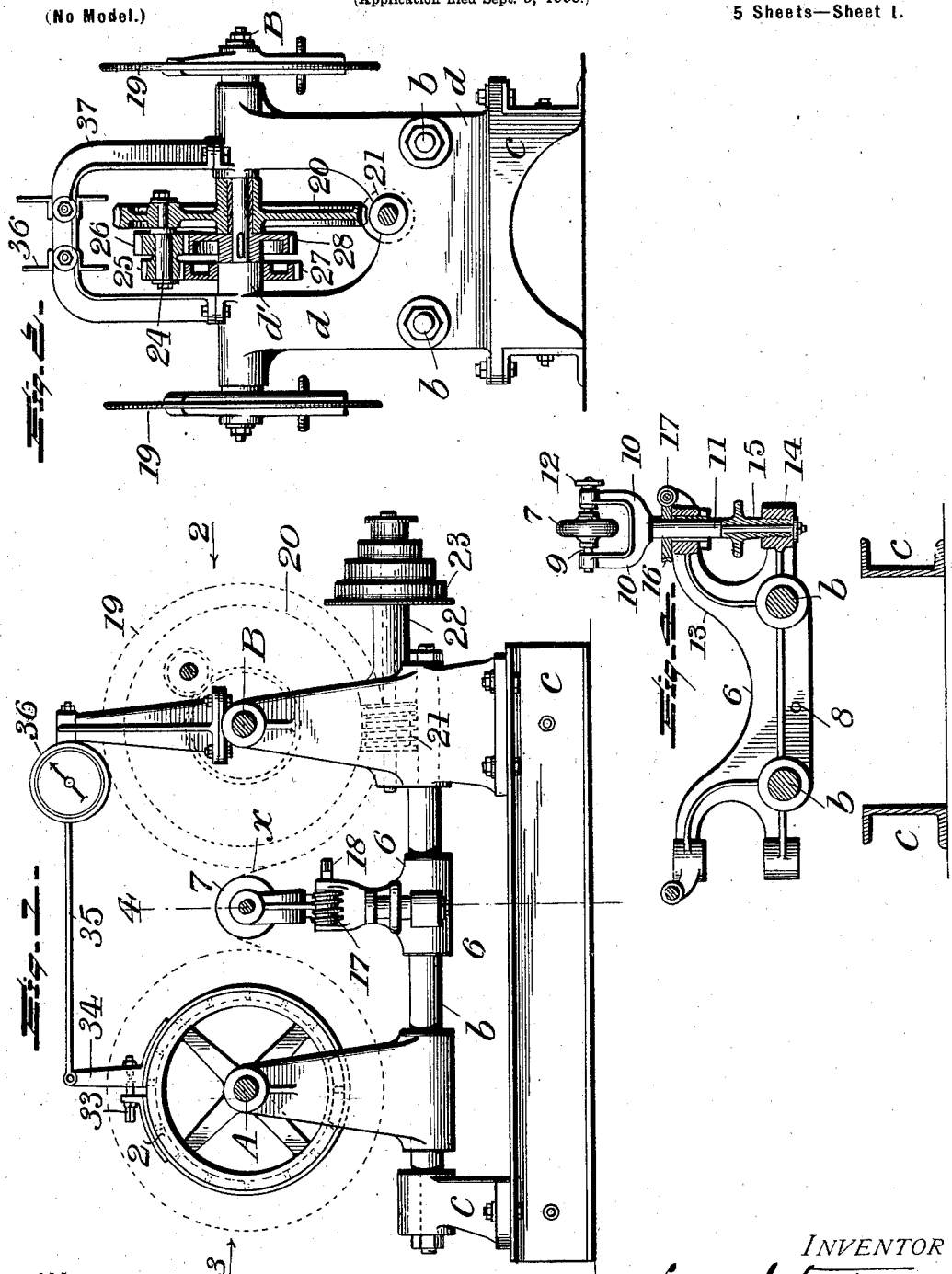

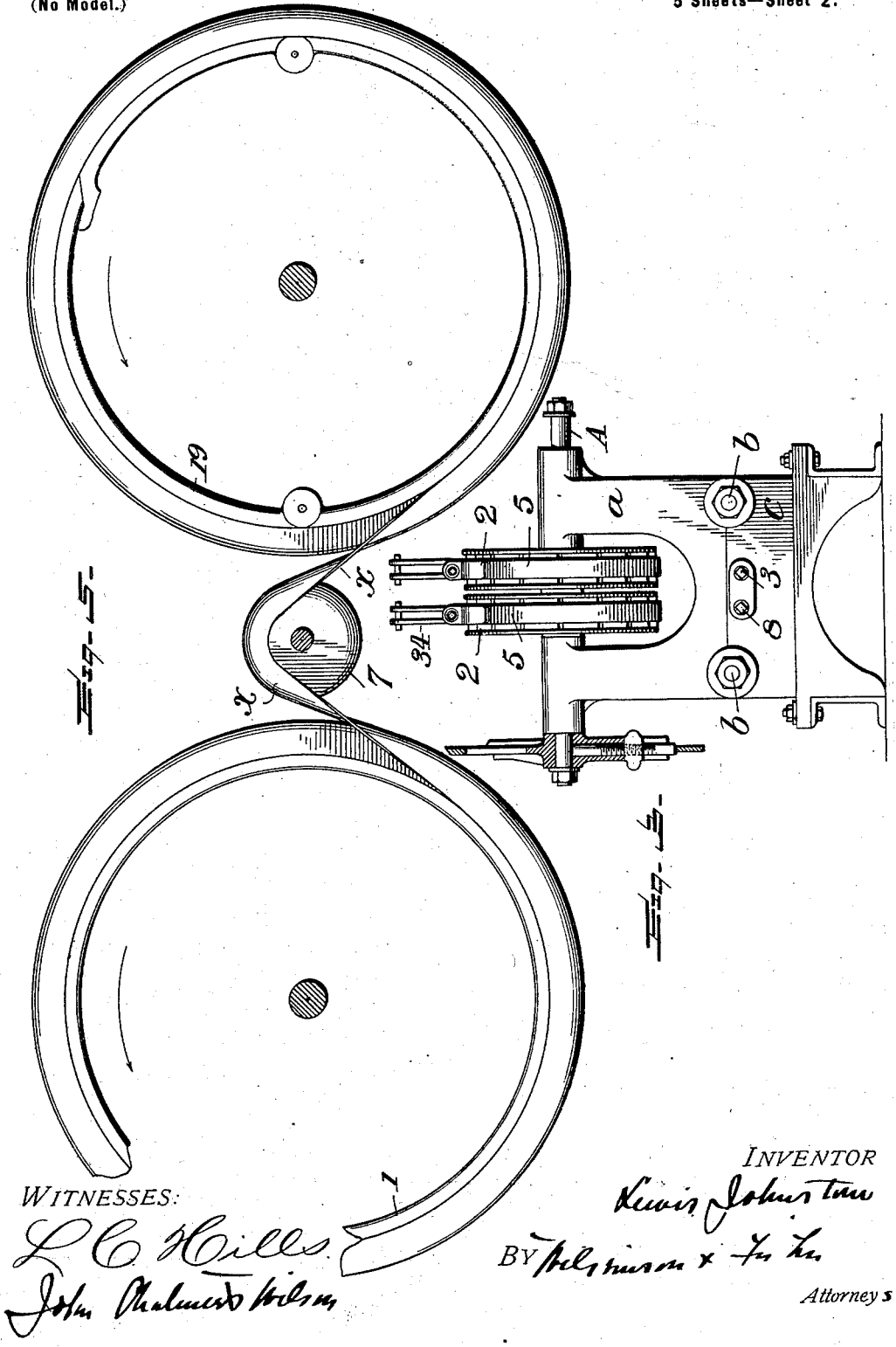

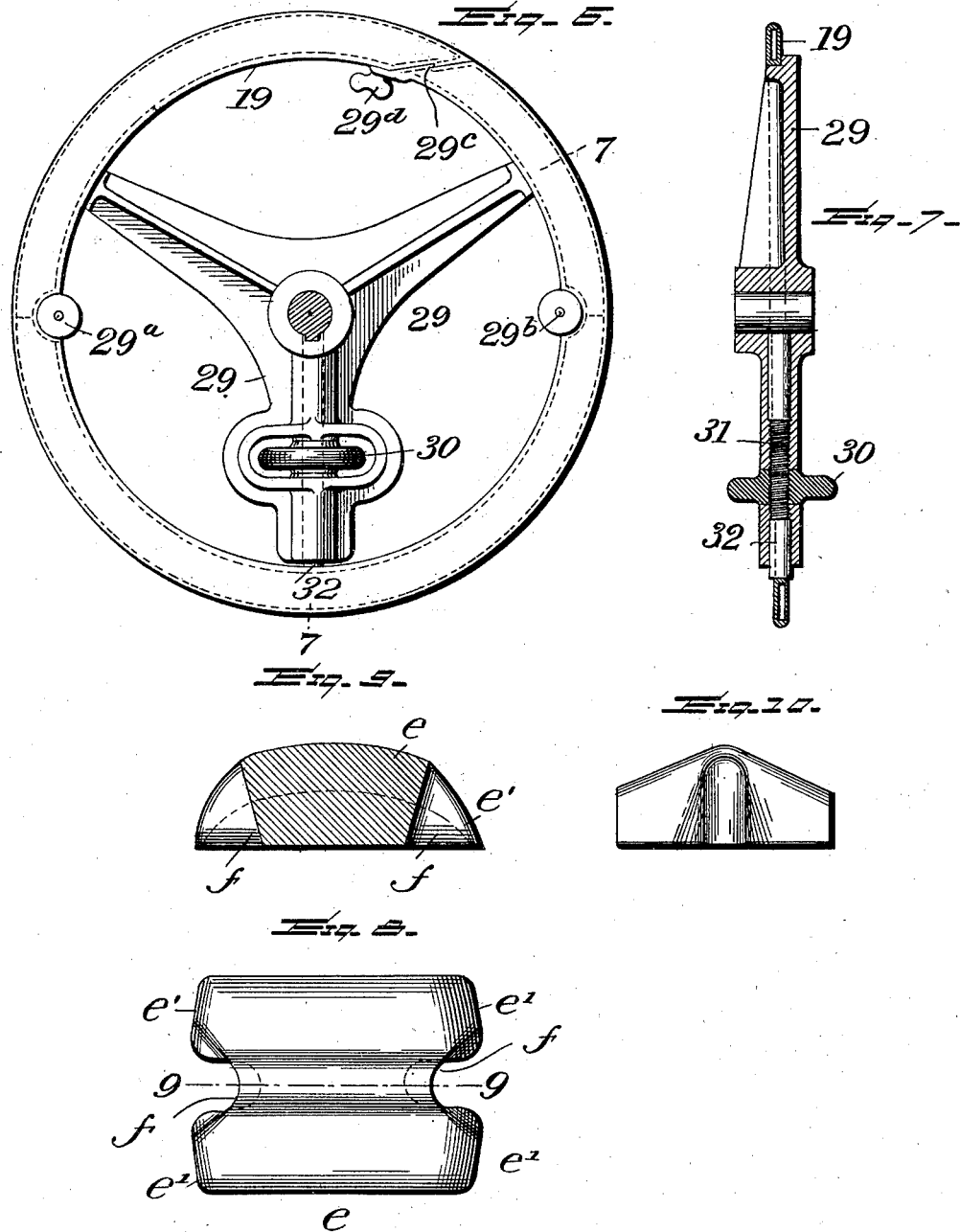

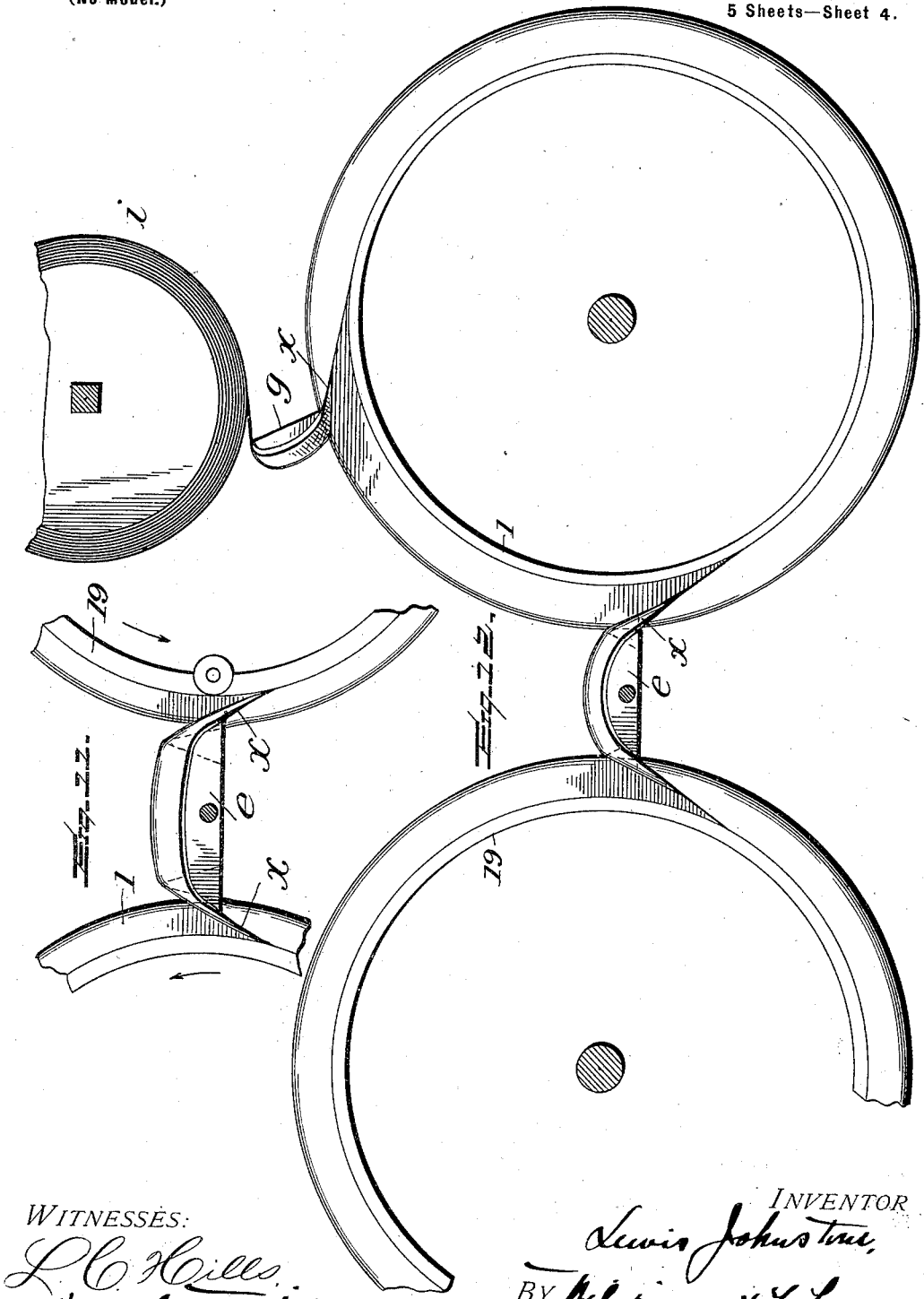

No. 669,837. Patented Mar. 12, 1901.
L. JOHNSTONE.
APPARATUS FOR STRETCHING FABRIC USED IN MAKING COVERS FOR PNEUMATIC TIRES.
(Application filed Sept. 5, 1900.)
(No Model.) 5 Sheets—Sheet 5.
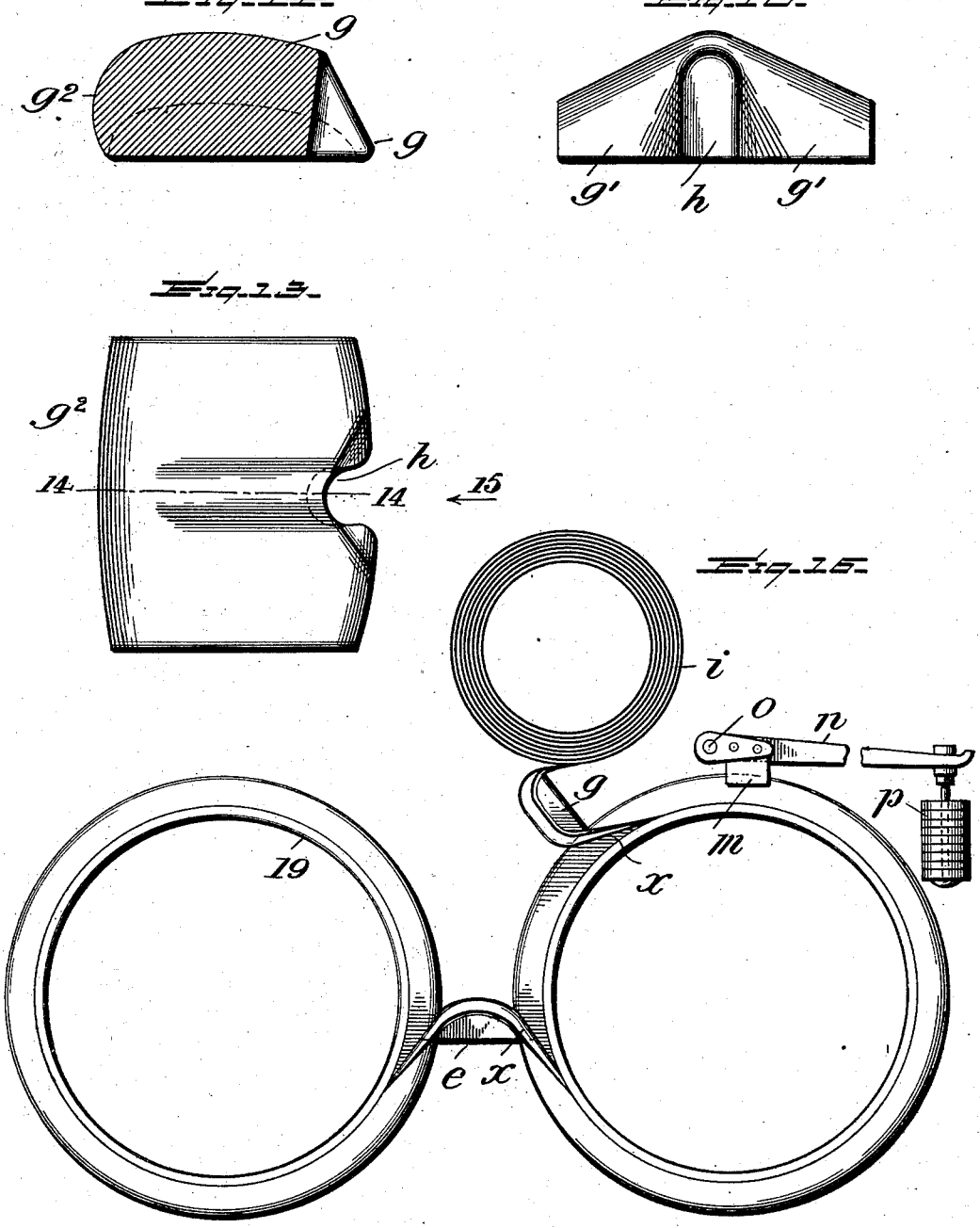

UNITED STATES PATENT OFFICE.

LEWIS JOHNSTONE, OF PRESTWICH, ENGLAND, ASSIGNOR TO THE RADAX PNEUMATIC TYRE COMPANY, LIMITED, OF WARRINGTON, ENGLAND.

APPARATUS FOR STRETCHING FABRIC USED IN MAKING COVERS FOR PNEUMATIC TIRES.

SPECIFICATION forming part of Letters Patent No. 669,837, dated March 12, 1901.

Application filed September 5, 1900. Serial No. 29,103. (No model.)

*To all whom it may concern:*

Be it known that I, LEWIS JOHNSTONE, engineer, a subject of the Queen of Great Britain, residing at 46 Gardner road, Prestwich, in the county of Lancaster, England, have invented a certain new and useful Apparatus for Stretching Fabric for the Manufacture of Detachable Covers for Pneumatic Tires, of which the following is a specification.

This invention relates to means for manufacturing detachable covers for pneumatic tires from a self-shaped fabric—that is, a fabric which is curved or specially shaped in the weaving—viz., curved to the radius (or thereabout) of the tire, when inflated, in respect of which such detachable covers are to be used.

Heretofore it has been proposed in patents of earlier date to employ a textile fabric (advantageously a woven cotton cloth or canvas of sufficient strength and resilience) formed somewhat V-shaped or U-shaped in cross-section and also curved in the direction of its length to or about the radius of the tire to be made, such shaped fabric being woven or produced in any suitable manner.

According to the present invention such specially-shaped fabric is treated as follows: Two drums, reels, or rings (which for the sake of brevity will hereinafter be referred to as "rings") are employed, advantageously of the diameter of the finished tire, but narrower in cross-section and mounted in the same plane. Two or more pairs of such rings may be similarly mounted in one machine, the rings in each pair being arranged in the same plane. Between each pair of rings and in the same plane therewith is arranged a small drum, reel, roller, or ridge, (which may either be formed in one piece or of a number of parts,) hereinafter referred to as the "roller." This roller is advantageously an idle roller and is adapted to be adjusted in any desired direction in relation to its pair of rings. The said rings (or one of them) may be adapted to be independently adjusted toward and away from one another or from the roller or in any other desired direction, the object of which adjustment will be hereinafter explained. One end of a length of the specially-shaped fabric is secured to one of the rings, (which I will hereinafter term the "brake-ring,") and such length of fabric is wound thereon. The other end of the length of fabric is led from the brake-ring over the roller and thence to a second ring, (which I will hereinafter term the "winding-ring,") to which latter it is firmly secured. A suitable brake or drag or retarding action is upon the brake-ring, while the winding-ring is revolved by any suitable means, by preference very slowly. The roller, which is preferably of a convex form, is so adjusted with respect to the two rings (or one or other of the rings is so adjusted with respect to the roller) that as the fabric is dragged off the brake-ring it will be inverted or turned inside out as it passes over the roller and turned back again or reinverted between the roller and the winding-ring, while at the same time the fabric is in very great tension and is strongly stretched during such circuitous passage from the brake-ring to the winding-ring; on which latter the stretched fabric is wound and thereafter employed for the purpose of manufacturing the detachable covers for pneumatic tires in any suitable or desirous manner. Before removing the stretched fabric from the winding-ring and before the tension is released the fabric is clamped or secured in any suitable manner on the winding-ring and removed from the machine and the fabric still on the ring is subjected to the action of wet steam and dried or treated in any other desired manner. It can, for instance, be immersed in a bath and dried or mercerized and washed and dried. India-rubber can also be applied to the fabric prior to the stretching and winding process, if so desired.

By this invention fabric of the kind described can be readily stretched in one operation—that is, a sufficient amount of the stretch can be taken out of the same to render same inextensible or sufficiently so to prevent the detachable outer cover made therefrom from coming off the rim when inflated under ordinary riding pressures.

In order that this invention may be more easily understood, I will proceed to further describe the same, with reference to the drawings hereunto annexed.

Figure 1 is a front view of the stretching-machine according to the present invention. Fig. 2 is a sectional view thereof looking in the direction of the arrow 2, Fig. 1. Fig. 3 is a view, partly in section, looking in the direction of the arrow 3, Fig. 1. Fig. 4 is a local vertical sectional view on line 4 4, Fig. 1, showing the mechanism for holding and adjusting the intermediate roller 2. Fig. 5 is a diagrammatic view showing the fabric inverted on the roller 2 as it is drawn off the ring 1 and again inverted as it is wound on the ring 19. Fig. 6 is a separate view of the said ring 19, showing means by which same is rendered collapsible, though, as hereinafter described, the winding-ring may in part of the operations be a solid and not a collapsible ring. Fig. 7 is a vertical sectional view thereof on line 7 7, Fig. 6. Figs. 8 to 11 illustrate a modified arrangement, Figs. 12 to 15 another modification, and Fig. 16 still another modification, as hereinafter described.

In the arrangement illustrated in said Figs. 1 to 7 the end of a length of the special fabric is firmly fixed to the brake-ring 1, and said fabric is then wound upon said ring 1. The ring 1 is fixed on the axle A, on which latter is also fixed the band-brake wheel 2. The axle A is journaled in the adjustable bearing or carriage $a$, which is adapted to slide upon the supporting bars or rods $b$, carried on the main frame or base $c$ of the machine, the said bearings or carriage $a$ being adjusted by means of the adjusting-screw 3. (See Fig. 3.)

5 indicates band-brakes which act on brake-wheels 2.

6 is an adjustable mount or carriage on which are carried or mounted the small rollers 7, one such roller only being shown in Fig. 4. The said mount is adapted to slide upon the fixed rods $b$ and can be adjusted thereon by means of the adjusting-screw 8. (See Figs. 3 and 4.) The roller 7 is an idle roller on the shaft 9, journaled in the forked arms 10 of the support 11. The shaft 9 is adjustable in the direction of its length by means of the screw-nut 12 thereon. The mount 11 is carried in the arms 13 and 14 of the mount 6 and can be adjusted vertically and turned upon its vertical axis. The vertical adjustment is obtained by means of the screw-sleeve 15, which screws through the internally-screw-threaded lower socket 14. The upper part of the spindle 11 has fixed thereon a worm-wheel 16, with which gears a worm 17, which can be rotated by the square end 18 on its shaft.

19 indicates the winding-rings, one on each side of the machine, which are fixed rigidly on the shaft B, which is journaled in the bearings or carriage $d$, fixed to the frame $c$ of the machine. On the shaft B is the worm-wheel 20, loosely mounted and driven by the worm 21 on the worm-shaft 22, which carries the driving-pulley 23, driven in any suitable manner. The worm-wheel 20 carries rigidly fixed thereto the crank pinion or spindle 24, on which rotate the pinions 25 and 26, these two latter being cast or otherwise formed together.

27 is a stationary toothed wheel keyed or otherwise fixed to the boss $d'$ of the carriage $d$.

28 is a toothed wheel keyed or otherwise rigidly fixed to the shaft B aforesaid. Thus it will be seen that as the worm-wheel 20 revolves it carries around the double pinions 25 26, the pinion 25 gearing with the stationary toothed wheel 27, and consequently the pinion 26 is thereby revolved, and this latter in turn revolves the toothed wheel 28, which, being fixed to the axle B, consequently will very slowly revolve the latter, and thus the speed is geared down and a very slow and steady rotation of the rings 19 is obtained. These rings 19 (when same are to be used as the mandrel on which the tire is to be built up and finished) are formed of sections hinged together at $29^a$ and $29^b$, and one of such segments is cut through diagonally, as at $29^c$, and provided with a clamping device $29^d$, the mandrel being thus made collapsible, as shown in Figs. 6 and 7, with a central frame 29, having three or other suitable number of arms, one arm of which is extensible by means of the internally-screwed nut or adjusting device 30, through which screws the screwed part 31 of the rod 32, by means of which latter the frame 29 may be given an expansible effect for the purpose of expanding the ring 19, and it can be tightly pressed and locked against the inner circumference of the collapsible ring 19, and thereby hold the same rigid, while when it is desired to collapse the ring this can be easily effected, as will readily be understood from the drawings. For instance, when the stretched fabric is wound upon the ring 19 and there finished to form the finished cover such ring 19 must be collapsed to enable such finished cover to be removed therefrom.

Referring to Figs. 1, 2, and 3, the band-brake 5 (the ends of which are provided with a screw-bolt 33 and nut thereon by which to vary the tightness of said band-brake 5 upon the brake-wheel 2) has an extension 34, to the upper end of which latter is pivoted a rod 35, which is connected to a dynamometer 36 or other suitable indicator or spring-balance. The latter is mounted on the framing or support 37, mounted on the fixed carriage $d$, so that any desired amount of brake or retardation can be put upon the brake-wheels 2, and consequently upon the rings 1, fixed on the shaft A, and at the same time the strain put upon the fabric is registered or indicated and can be readily seen upon the dynamometer. $x$ is the fabric to be stretched. Means are provided for readily mounting the rings 1 upon the shaft A or removing same therefrom, and similar means are used for mounting the rings 19 upon the shaft B. The rings 1 and 19 are narrow in cross-section, with a suitable circumferential edge, the rings being preferably made with parallel sides and rounded edges. By altering the contour of the roller 7 and altering its position relatively to the rings 1 and 19 thereby the stretch on different parts of the width of the fabric can be varied. In place of this roller 7 a fixed convex surface or ridge of any suitable shape may be employed.

The operation is as follows: The fabric $x$ is secured to and wound upon ring 1 and is led around the roller 7 and the end secured to and wound upon the winding-ring 19. The ring 1 is adjusted toward or away from the ring 19, as desired, and the roller 7 adjusted in any direction required and the band-brake 5 tightened up upon the brake-wheel 2, so as to put the desired amount of strain upon the fabric $x$. For example, it has been found in practice that with a curved fabric of the character described showing a breaking strain of, say, four hundred pounds to four hundred and fifty pounds (or thereabout) on the dynamometer if the strain put upon said fabric in stretching same (according to this invention) is made to indicate, say, one hundred and fifty pounds to one hundred and sixty pounds on the dynamometer 36 then such fabric will be rendered inextensible or sufficiently so (for the purposes stated) after same has been steamed or wetted and dried while still held stretched on the winding-ring, as hereinafter described. The shaft B and rings 19 thereon are then very slowly rotated, and the fabric is drawn off the ring 1 over the roller 7, on which it is inverted, and thence wound onto the ring 19 and inverted a second time as it is wound on the latter, and in this manner the fabric is in one operation stretched to such a degree as to render same practically inextensible for the purpose of forming the detachable covers of pneumatic tires, as aforesaid. The roller is manipulated by the worm-wheel while winding to guide the fabric.

The machine may be used as a stretching-machine pure and simple. In that case the brake-ring 1 and the winding-on ring 19 are both solid. The fabric to be stretched is wound on the brake-ring 1, the end being fastened to it. The other end of the fabric is fastened to the winding-on ring, and the fabric is then wound onto the said winding-on ring under great tension. When a sufficient length of the fabric has been thus wound onto the winding-on ring—say two or three laps—the fabric is clamped to the ring while still under tension, and the ring may then be removed from the machine. If now the fabric were removed from the ring, it would spring back; but the stretch is permanently removed by the fabric being steamed while clamped under tension. This steaming puts such strain on the fabric that after being dried while still clamped on the ring 19 the fabric will no longer spring back when the clamp is released. Instead of steaming the fabric while stretched on the ring the fabric may be mercerized or treated in any suitable bath and then dried before being released from the ring, or the fabric may be made wet before it is stretched and then when stretched and clamped on the ring allowed to dry there; but steaming has been found in practice to have many advantages.

The machine above described may be used for making up tires from already-stretched fabric in the following manner: A length of the stretched fabric, rubbered first to a sufficient extent, is wrapped on the brake-ring and wound under slight tension onto the winding-on ring, which in this case must be made collapsible. If the completed tire is to consist of more than one thickness of fabric, (which is in most cases preferred,) a slight tension only is used after a sufficient thickness of fabric has been wound on the ring, and when dried the ring is collapsed and the tire removed from the ring.

I may also use my improved apparatus for the manufacture of tires in the following manner: The unstretched fabric, fully or partially impregnated with rubber, may be placed on the brake-ring and wound onto the winding-ring under great tension and there clamped. Whether the fabric has been fully or only partially impregnated with rubber, it must, while still clamped on the winding-ring, be steamed and dried. If the fabric has been fully rubbered in its unstretched condition and is placed in that condition on the brake-ring, it may be thence at once wound under great tension onto a collapsible winding-on ring and stretched and finished in one winding operation.

Referring now to the modification shown in Figs. 8 to 11, instead of using a rotatable roller 7, as shown in Figs. 1 to 5, to convert the fabric, a fixed block, horn, or ridge $e$ may be used for the same purpose. Fig. 8 is a plan of a suitably-shaped block. Fig. 9 is a longitudinal section thereof on line 9 9, Fig. 8; Fig 10, an end view of the block $e$, and Fig. 11 a local diagrammatic view (after the manner of Fig. 5) showing the block $e$ fixed in position between the unwinding-ring 1 and the winding-ring 19. The said block $e$ is recessed and undercut at each end at $f$, as shown in Figs. 8 and 9, so that rounded ends project at each of the four corners $e'$ of said block $e$, the object of this construction being that the undercut recess $f$ enables the block $e$ to fit over without touching the rings 1 and 19, respectively, so that the rounded corners or projections $e'$ on said block $e$ fit into and support the fold of the fabric $x$ as same is being inverted while passing from the unwinding-ring onto the block $e$ and again to fit into and support the fold of the fabric $x$ as same is being reinverted while being drawn off the fixed block $e$ onto the winding-ring 19. The fabric $x$ thus slides over the block $e$, the rubbing contact-surface of which latter is smooth, and by tilting the block $e$ or altering the position of same relatively to the ring 1 or ring 19, or both, thereby more stretch can be taken out of the fabric at one point than at others, means being provided to support and adjust said block *e* in a similar manner to those shown for supporting the roller 7, (see Figs. 1 and 4,) or the block *e* may be supported and adjusted in any position by any suitable means, as will be readily understood and need not therefore be further described here.

Instead of winding the fabric on the brake-ring I have in Figs. 12 to 15 shown how this apparatus can be used so as to enable the fabric to be stretched continuously from the "batch" or continuous bobbin. Fig. 12 is a diagrammatic view showing how the apparatus would then be worked. An additional fixed block *g* (shown in detail in Figs. 13 to 15) may be usefully employed in guiding the fabric from the stock-bobbin onto the brake-ring. Fig. 13 is a plan of a suitable block *g*; Fig. 14, a longitudinal sectional view on line 14 14, Fig. 13; and Fig. 15, an end view thereof looking in the direction of the arrow 15, Fig. 13. The bobbin of material *i* may advantageously be mounted over the brake-ring 1, and instead of fixing the fabric to this ring, as previously described, the surface should be roughened or provided with pins or equivalent arrangement to prevent the material *x* from being dragged over the brake-ring 1 at a speed quicker than the brake-ring 1 is allowed to revolve. From the brake-ring 1 the material passes to the winding-ring over a similar block *e* and in a similar manner to the arrangement previously described with reference to Figs. 8 to 11. A convenient form for the block or shoe *g* as employed in Fig. 12 is shown in Figs. 13, 14, and 15. The block is formed with an undercut recess *h*, (similar to the recess *f* in the block *e*,) so as thus to form projecting rounded corners *g'* (similar to the corners *e'*) at one end only. The other end $g^2$ of the shoe *g* is slightly rounded in a convex manner, so as to pass the cloth *x* coming from the bobbin *i* over the convex end $g^2$ onto the shoe *g* and thence onto the ring 1, the cloth being inverted as it passes from the shoe *g*.

Fig. 16 is a diagrammatic view illustrating an arrangement similar to that shown in Fig. 12, except that the brake-ring 1, instead of revolving, has a brake-shoe *m* applied directly to the fabric, which is dragged between the brake-block *m* and the ring 1, so that the fabric is thus held back or retarded, and consequently stretched, as it is drawn by and wound onto the winding-ring 19. This brake-block *m* may be applied in any suitable manner to the ring 1 and by any suitable means—as, for instance, by means of the brake-lever *n*, turning about the fulcrum *o*, this lever being weighted at *p*, so that, according to the leverage and weighting of the lever *n*, any desired pressure or braking action can be obtained. No dynamometer or separate band-brake wheel will then be required.

Having now described my invention, what I claim as new, and desire to secure by Letters Patent of the United States, is—

1. The combination in a machine for use in the manufacture of detachable covers for pneumatic tires of a convex winding-ring adapted to have wound thereon a curved woven fabric, a convex surface adjustably mounted proximate to said winding-ring over which said curved woven fabric is drawn and means to clamp said fabric on said winding-ring substantially as and for the purposes hereinbefore described.

2. A machine for use in the manufacture of detachable covers for pneumatic tires, having a brake-ring therein adapted to have passed around same a curved woven fabric, a winding-ring onto which said fabric is wound from the brake-ring, means to retard the passage of said fabric onto said winding-ring, means to revolve the said winding-ring, and a convex surface adjustably mounted between said brake-ring and said winding-ring, all combined and arranged to act substantially as and for the purposes hereinbefore described.

3. A machine for use in the manufacture of detachable covers for pneumatic tires having a brake-ring therein adapted to have passed around same a curved woven fabric, a guiding-shoe proximate to said brake-ring and adapted to guide the curved woven fabric from the batch onto said brake-ring, a winding-ring, onto which the said fabric is wound from the brake-ring, means to retard the passage of said fabric onto said winding-ring, means to revolve the said winding-ring, and a convex surface adjustably mounted between said brake-ring and said winding-ring, all combined and arranged to act substantially as and for the purposes hereinbefore described.

4. A machine for the purpose of stretching a curve-shaped textile fabric so as to render the same practically inextensible in the direction of its length consisting of a brake-ring, means to retard the passage of the fabric around such ring, a winding-ring, onto which the said fabric is wound off the brake-ring, means to revolve the said winding-ring and a convex surface mounted adjustably between said brake and winding ring combined and arranged to act substantially as and for the purposes hereinbefore described.

In witness whereof I have hereunto set my hand in presence of two witnesses.

LEWIS JOHNSTONE.

Witnesses:
ERNALD S. MOSELEY,
ARTHUR V. BATHO.